United States Patent [19]

Lundborg

[11] 4,392,537
[45] Jul. 12, 1983

[54] WEIGHBRIDGE AND METHOD OF PRODUCING IT

[75] Inventor: Olle G. Lundborg, Malmö, Sweden

[73] Assignee: AB Bofors Elektronik, Bofors, Sweden

[21] Appl. No.: 274,203

[22] PCT Filed: Oct. 15, 1980

[86] PCT No.: PCT/SE80/00149
§ 371 Date: Jun. 15, 1981
§ 102(e) Date: Jun. 15, 1981

[87] PCT Pub. No.: WO81/01197
PCT Pub. Date: Apr. 30, 1981

[51] Int. Cl.³ .............................................. G01G 19/02
[52] U.S. Cl. ..................................... 177/134; 177/135
[58] Field of Search ............................... 177/134, 135

[56] References Cited
U.S. PATENT DOCUMENTS
3,442,343  5/1969  Marion .................................. 177/134
3,770,068 11/1973  Ahl ........................................ 177/134

FOREIGN PATENT DOCUMENTS
2439266  2/1976  Fed. Rep. of Germany ...... 177/134

Primary Examiner—George H. Miller, Jr.
Attorney, Agent, or Firm—Jon M. Lewis

[57] ABSTRACT

Figure 2:
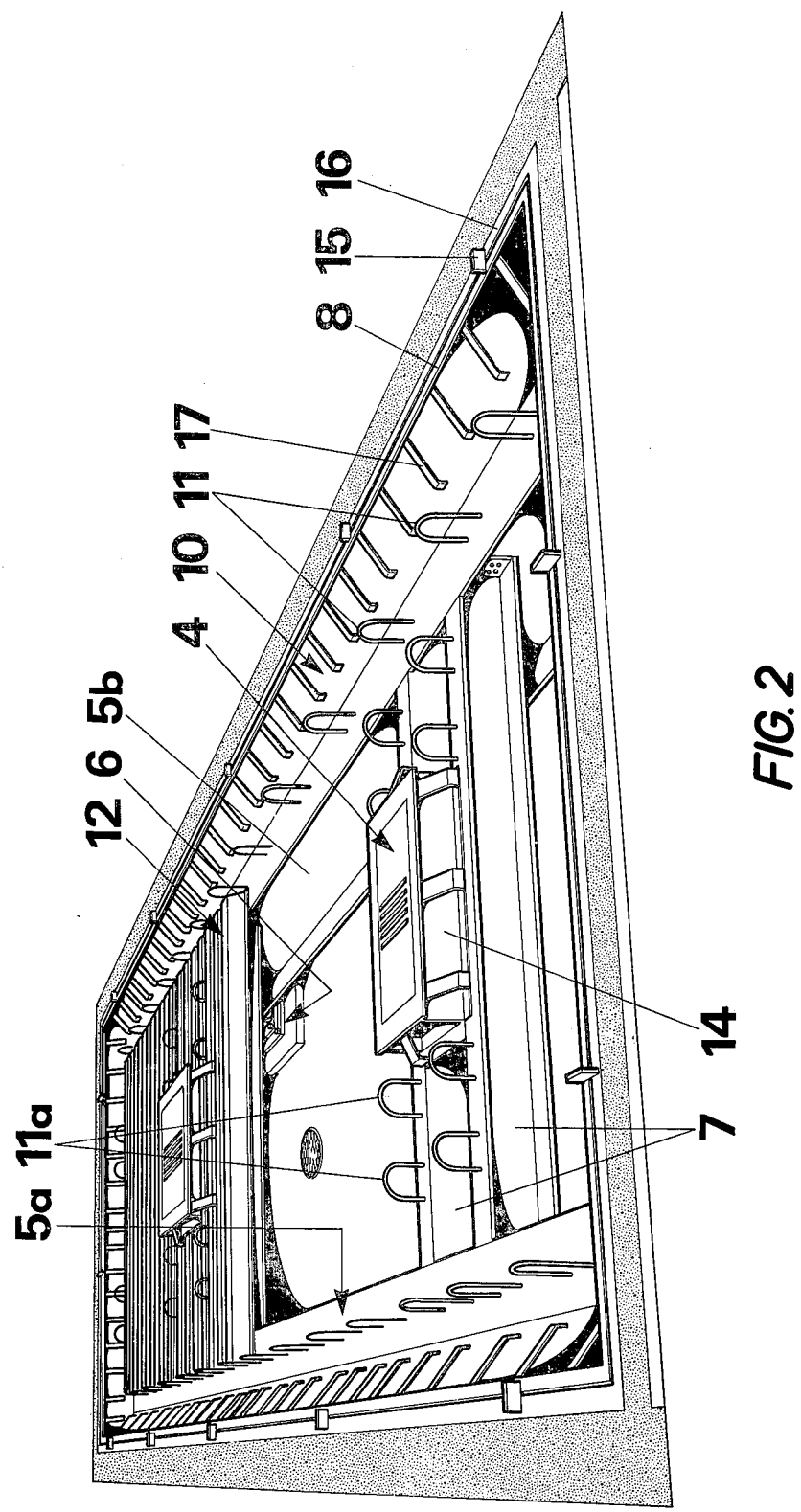

The present invention relates to a weighbridge consisting at least partially of cast concrete portions, and a method of producing such a bridge. With the object of increasing the accuracy of a weighbridge, of facilitating and cheapening the production of a weighbridge, it is proposed according to the present invention that the bridge (1) should be disposed resting against two beams (5) which are disposed along the long sides of the bridge and supported by transmitter members (6), that at least two transverse beams (7) are disposed secured between the longitudinal beams (5) of the bridge, preferably at the short sides of the bridge, that the cast portions of the bridge are surrounded by an edge lining (3) preferably of sheet metal bearing downwards against the tops of the beams (5, 7), and that the cast portions preferably comprise a corrugated or profiled bottom metal sheet (12) resting substantially against the longitudinal beams of the bridge. As a result of the invention, it becomes possible to cast the weighbridge on site above the longitudinal beams, and the mould formed by the edge lining, beams and metal sheets does not have to be removed after the cast concrete has set. (FIG. 2).

8 Claims, 4 Drawing Figures

WEIGHBRIDGE AND METHOD OF PRODUCING IT

The present invention relates to a weighbridge, at least partially consisting of cast concrete parts, and a method of producing the weighbridge.

It is already known to manufacture weighbridges from cast concrete or as all-welded steel constructions. The cast weighbridges, which are cast, for example, directly in a weighing pit, therefore require a special mould dimensioned to take up the whole weight of the weighbridge. It is often necessary to carry out a stamping of the mould which is particularly difficult in view of the fact that the weighbridge is cast in a special weighing pit which is not wanted too deep for reasons of cost, which means that the space below the weighbridge is limited. After the setting of the concrete, the mould has to be broken up and removed through a manhole in the weighbridge, which work is time-consuming and therefore expensive. A further expense in connection with casting known weighbridges is that they have to be made with special beam sections adapted to bear against transmitter members.

The use of weighbridges consisting of all-welded steel constructions eliminates many of the disadvantages associated with the casting of weighbridges. For various reasons, a welded weighbridge has to be made with great accuracy which means that it is extremely inconvenient to weld the weighbridge together on site in the weighing pit. A finished weighbridge may have dimensions of 3×18 m, which means that special arrangements have to be made for such a weighbridge to be able to be transported from the place of manufacture. An all-welded weighbridge is nevertheless preferable since its lower weight in comparison with the weight of a cast weighbridge leads to more accurate weighing.

The present invention provides a weighbridge and a method of producing it which to a large extent eliminates the problems and disadvantages which exist with known weighbridges. A weighbridge according to the present invention has several of the advantages of a welded weighbridge but none of the disadvantages which are associated with the production of known cast weighbridges. Thus, the object of the present invention is to provide a weighbridge which can easily be produced directly in a weighing pit, which has considerably lower weight in comparison with known cast weighbridges and which, in addition, is cheaper to produce than known weighbridges.

The objects given above are achieved according to the present invention by giving the weighbridge and the method for its production the characteristics given in the patent claims.

By casting the weighbride directly on a mould, preferably of metal, which mould does not need to be removed after the setting of the concrete and which rests directly against two beams disposed along the long sides of the weighing pit and supported by the transmitter members, a comparatively light weighbridge with the necessary strength is obtained. Transverse beams between the longitudinal beams are preferably bolted to these and at the same time constitute a support for or part of the mould. The mould is bounded by an edge lining which bears with a sealing action against the tops of the beams. The edge lining only needs to be dimensioned to take up the stresses which occur during the casting of the concrete in the mould.

A preferably corrugated or profiled metal sheet is disposed on the beams with a sealing action against the tops of the beams. A plane-profiled metal sheet is preferred since this permits the placing of reinforcing iron in each profiling, while at the same time the volume of concrete can be reduced without detriment to the necessary strength of the weighbridge.

As a result of the fact that the edge lining is bounded at the top by a T-beam, to the web of which there is secured a metal sheet disposed close to the tops of the beams, objects are effectively prevented from becoming wedged between the edge of the weighbridge and the surrounding edges of the weighing pit, adjacent to the weighbridge. An edge lining thus shaped also permits an easy joining at the corner portions of the mould.

Placed between the corrugated metal sheets and the tops of the beams is a seal which is shaped in accordance with the corrugations of the metal sheet with the object of preventing the concrete from leaking out during the casting of the weighbridge. The corrugated metal sheets may appropriately be screwed firmly to the tops of the beams to bring about a compression of the seal.

Part of the weighbridge can be formed as continuous gratings through which grain, for example, can be unloaded for further conveying to a grain conveyor placed under the weighbridge.

The cast concrete portions of the weighbridge may also be given an inclination towards the centre where an opening is situated for water to run away. Directly below the opening in the weighbridge, wells may appropriately be provided in the bottom of the weighing pit which means that the main part of the bottom of the weighing pit can be kept dry.

When the bottom of the mould consists partially of the longitudinal beams and the tops of the transverse beams, it is advisable to fix reinforcing iron to said tops.

With the object of stiffening the edge lining and locating this during the casting of the concrete, spacing elements are welded to the upper portion of the edge lining, that is to say in the T-beam, and in an edge lining at the upper edge portion of the weighing pit. When the concrete has set, these spacing members are removed, whereupon the weighbridge is ready for used.

Figure 1:
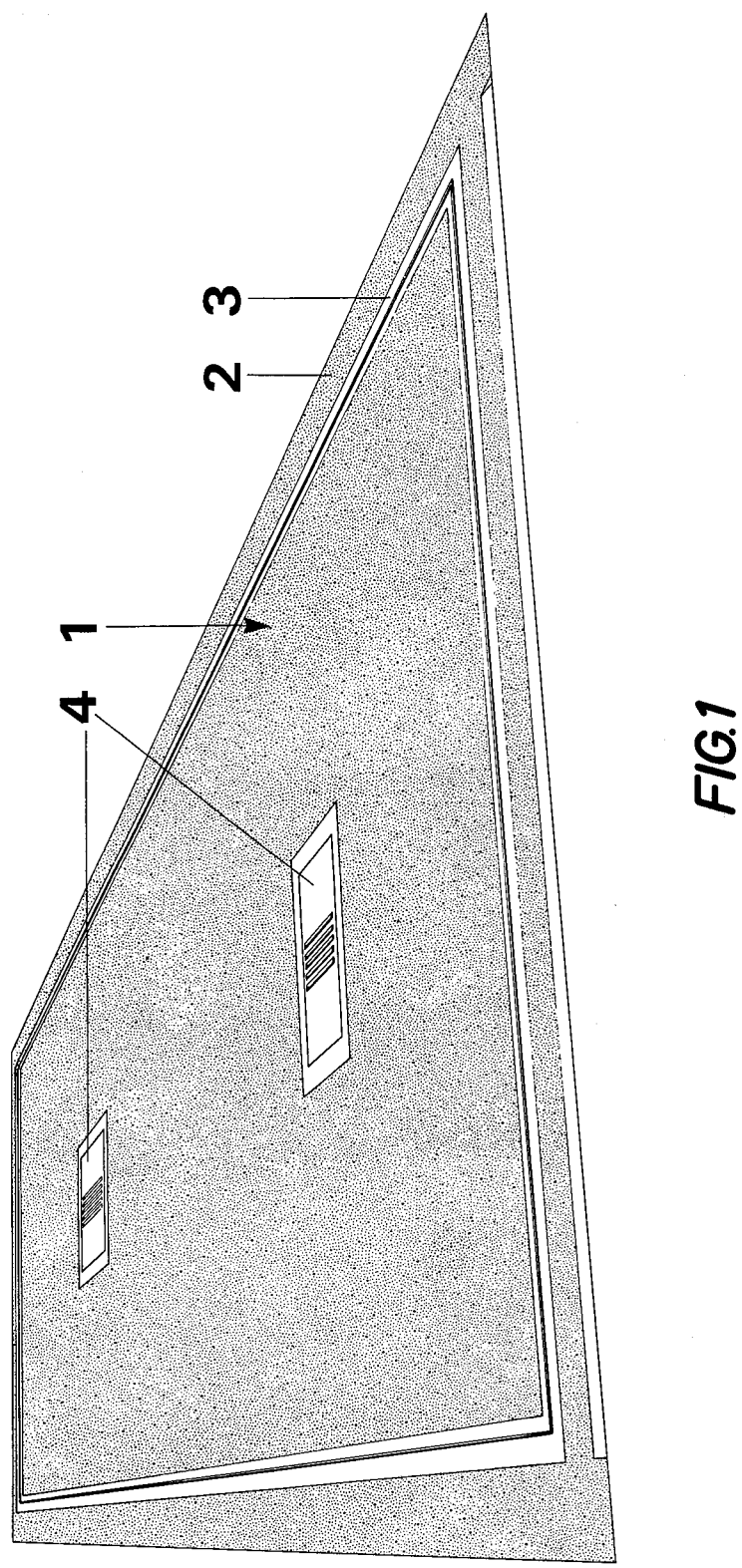
Figure 3:
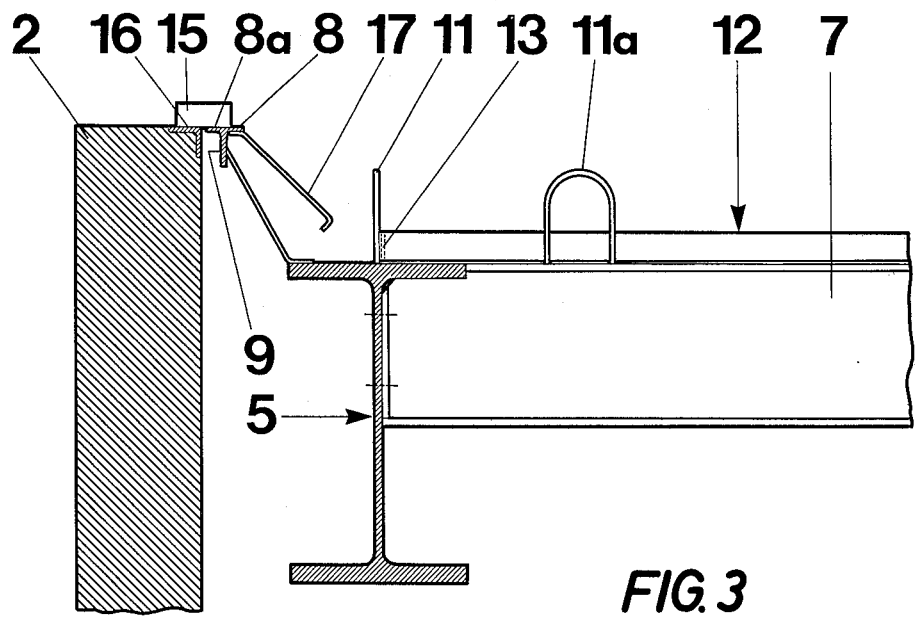
Figure 4:
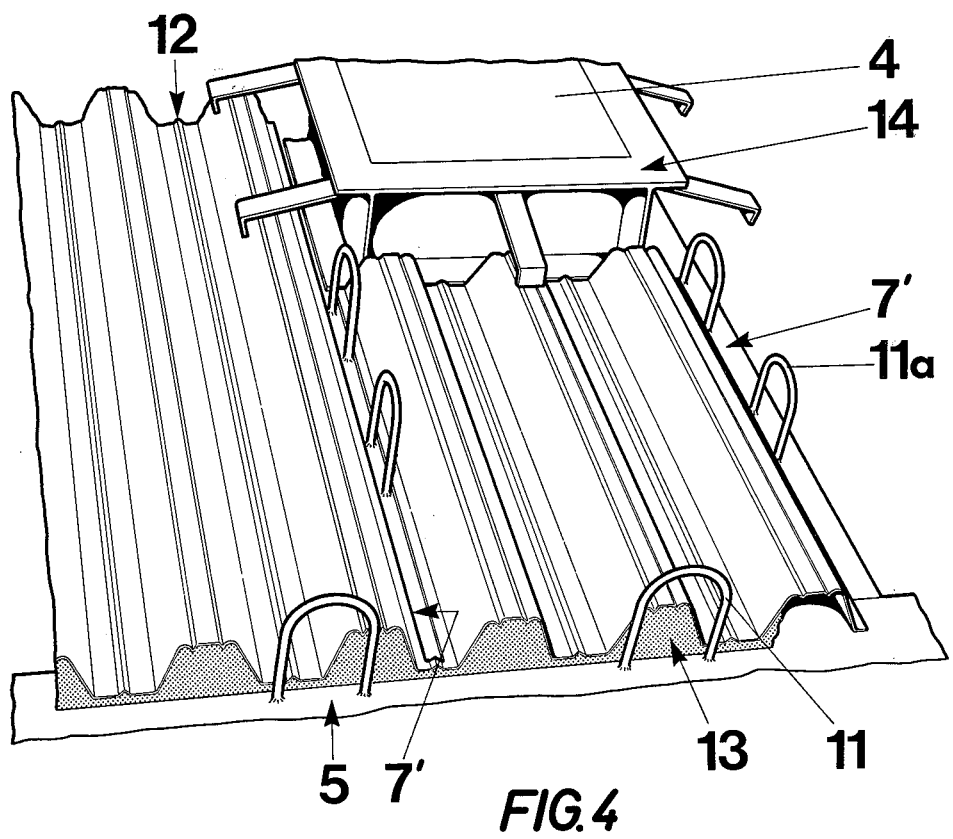

The invention will now be described with reference to an example of embodiment illustrated in which FIG. 1 is a perspective view of a finished weighbridge according to the invention, FIG. 2 is a perspective view similar to FIG. 1, but in which the weighbridge is shown in various stages of production and wherein certain parts are left out for the sake of clarity, FIG. 3 is a partial section through the finished weighbridge showing its one edge portion set up and cast directly on a longitudinal beam, the arrangement of the profiled metal sheets and their sealing also being shown, and FIG. 4 shows, in perspective, a portion of the weighbridge with a manhole and drainage hole disposed centrally.

FIG. 1 shows the finished weighbridge 1 in position in a cast weighing pit, the later edges 2 of which are closely connected to the edge lining 3 of the weighbridge. The weighbridge shown here is entirely cast in concrete apart from two centrally situated manhole covers and drainage hole covers 4. The top of the weighbridge 1 has a fall towards the hole covers 4.

The production of the weighbridge 1 will now be described with reference to FIG. 2. Two longitudinal beams 5a and 5b are first placed in the finished weighing pit and secured in at least four transmitter members 6, that is to say at least two transmitter members under each longitudinal beam 5. A transverse beam 7 is disposed at least at each short side of the weighbridge and is there bolted to the longitudinal beams 5. For this purpose, the transverse beams 7 are provided with transverse flange plates which are bolted to the webs of the longitudinal beams. The frame formed by the beams 5 and 7 thus constitutes a support for the weighbridge which consists wholly or partially of cast portions.

In order to render possible a casting of the weighbridge, an edge lining 3 is disposed round the cast portions of the bridge. FIG. 3 shows an embodiment of the edge lining 3, the upper portion of which consists of a T-beam 8 at the web 9 of which a plate 10 is directed down towards the top of the longitudinal beam 5 and secured to this with a sealing action by screwing or welding. The outer portion 8a of the T-beam eliminates, to a large extent, the risk of objects becoming wedged between the weighbridge and the side wall of the weighing pit, while at the same time the web 9 of the beam forms a drip nose.

Reinforcing irons 11 and 11a are welded to the tops of the longitudinal beams 5 and of the transverse beams 7.

Placed between the longitudinal beams 5 is a plane-profiled metal sheet 12 which sheet forms the bottom of the mould in which the concrete is to be cast to form the weighbridge. A seal 13 is placed between the metal sheet 12 and the tops of the longitudinal beams 5. If necessary, a seal is also placed between the metal sheet 12 and the tops of the transverse beams 7 with the object of creating a sealed mould which prevents leakage of concrete during casting of the weighbridge. Since the sheet metal 12 is not to be removed after the weighbridge has been finished, the metal sheet may appropriately be galvanized.

FIG. 4 shows the installation of a manhole and drainage hole cover 4 in the weighbridge. The hole cover 4 is surrounded by a frame 14 resting against two transverse beams 7', likewise provided with reinforcing iron 11', which means that the sheet metal 12 is cut off and sealed at the tops of the transverse beams 7'. At the height of the hole cover 4, the sheet metal 12 is disposed resting partially against the longitudinal beams 5 and partially against a lower portion of the frame 14 of the hole.

If a weighbridge is desired with a larger grating opening, for example for grain, the procedure is the same as given above in connection with the hole cover 4.

When the edge lining 3, the sheet metal 12 and possible hole covers 4 have been placed in position and possibly sealed against the tops of the beams 5 and 6, the mould thus formed is ready for filling with concrete. Spacing elements 15 (FIG. 3) locate the upper portion of the edge lining at the upper wall edge 16 of the weighing pit, consisting for example of an angle section, after which the casting can begin after the necessary reinforcement has been inserted in the mould. The upper portion of the edge lining 3 may appropriately be provided with reinforcement 17 to ensure the edge strength of the weighbridge.

The invention is not limited to the example of embodiment shown, but modifications can be made within the scope of the following patent claims.

I claim:

1. A weighbridge, comprising a cast concrete slab (1) and having supporting beams (5) resting upon transmitter members (6) wherein said supporting beams (5) being disposed as longitudinal beams of a metal frame consisting of said longitudinal beams interconnected by transverse beams, said metal frame supporting a preferably corrugated bottom metal sheet (12) of said concrete slab (1), that said concrete slab being in cast connection with said frame (5, 7) on the upper side of the metal bottom sheet and surrounded by a metal edge lining connected to the frame, and that the edge lining (3) is bounded at the top by a T-beam (8, 9), secured to the web (9) of which a metal sheet (10) is disposed at the tops of the beams.

2. A weighbridge as claimed in claim 1 and wherein a plane corrugated metal sheet is used, characterized in that between the plane corrugated metal sheet (12) and the longitudinal beams (5) there is a seal (13) shaped in accordance with the corrugation of the metal sheet (12).

3. A weighbridge as claimed in claim 2, characterized in that the plane corrugated metal sheet (12) is screwed to the longitudinal beams to bring about a compression of the seal (13).

4. A weighbridge as claimed in claim 1, characterized in that a through grating is disposed at least at one part of the bridge.

5. A weighbridge as claimed in claim 4, characterized in that the cast concrete portions are adapted with an inclination in towards the centre, where holes extending through the weighbridge are provided for water to run off.

6. A weighbridge as claimed in claim 4, characterized in that reinforcing irons (11, 17) are secured to the tops of the beams and to the edge lining (3).

7. A method of producing a weighbridge, comprising a cast concrete slab (1) and having supporting beams (5) resting upon transmitter members as claimed in claim 1 characterized in that placed on longitudinal beams placed on transmitter members of the weighbridge and on outer transverse beams connecting the longitudinal beams is an edge lining in sealing cooperation with the tops of the beams, that the upper outer portion of the edge lining is secured to a frame surrounding the weighbridge, that a bottom metal sheet, which is preferably corrugated or profiled, is placed on the beams of the bridge in sealing cooperation with the tops of the beams so as to cover completely the space between the beams at the parts which are to be cast, that reinforcement is possibly inserted in the mould formed by the edge lining, the beams and the metal sheet, that concrete is cast in the mould, after which the upper portion of the edge lining is detached from the frame surrounding the weighbridge after the concrete has set.

8. A method as claimed in claim 7, characterized in that the transverse beams are bolted to the longitudinal beams.

* * * * *